(12) United States Patent
Carlson

(10) Patent No.: US 7,848,980 B2
(45) Date of Patent: Dec. 7, 2010

(54) MOBILE PAYMENT SYSTEM AND METHOD USING ALIAS

(75) Inventor: Mark Carlson, Half Moon Bay, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 349 days.

(21) Appl. No.: 11/767,033

(22) Filed: Jun. 22, 2007

(65) Prior Publication Data

US 2008/0154772 A1    Jun. 26, 2008

Related U.S. Application Data

(60) Provisional application No. 60/871,898, filed on Dec. 26, 2006.

(51) Int. Cl.
    *G06Q 40/10* (2006.01)
(52) U.S. Cl. ........................................................ 705/35
(58) Field of Classification Search .................... 705/35
See application file for complete search history.

(56) References Cited

U.S. PATENT DOCUMENTS

| | | | |
|---|---|---|---|
| 5,659,165 A | 8/1997 | Jennings et al. | |
| 5,991,749 A | 11/1999 | Morrill, Jr. | |
| 6,029,151 A | 2/2000 | Nikander | |
| 6,227,447 B1 | 5/2001 | Campisano | |
| 6,267,292 B1 | 7/2001 | Walker et al. | |
| 6,341,724 B2 | 1/2002 | Campisano | |
| 6,488,203 B1 | 12/2002 | Stoutenburg et al. | |
| 6,747,547 B2 | 6/2004 | Benson | |
| 6,868,391 B1 | 3/2005 | Hultgren | |
| 7,089,208 B1 | 8/2006 | Levchin et al. | |
| 7,099,850 B1 | 8/2006 | Mann et al. | |
| 7,194,437 B1 | 3/2007 | Britto et al. | |
| 7,231,372 B1 | 6/2007 | Prange et al. | |
| RE39,736 E | 7/2007 | Morrill, Jr. | |
| 7,407,094 B2 | 8/2008 | Myers et al. | |
| 2003/0126078 A1 | 7/2003 | Vihinen | |
| 2003/0212642 A1* | 11/2003 | Weller et al. | 705/67 |
| 2004/0049455 A1 | 3/2004 | Mohsenzadeh | |

(Continued)

FOREIGN PATENT DOCUMENTS

GB    2348781 B    11/2003

(Continued)

OTHER PUBLICATIONS

No Author. Virtual Shopping: Straight Goods on Cyber-stores and Security. Chatelaine. Toronto. Feb. 1997, vol. 70, p. 24.*

(Continued)

*Primary Examiner*—James P Trammell
*Assistant Examiner*—Abdul Basit
(74) *Attorney, Agent, or Firm*—Townsend and Townsend and Crew LLP

(57) ABSTRACT

Methods and systems are disclosed for allowing financial transactions to be conducted using mobile phones. A payer initiates a transaction by sending a payment request message from a mobile phone which specifies the payee and amount to be paid. Payees are identified by unique aliases, which are maintained in a database. Methods for assembling the enrollment and alias database are included.

30 Claims, 6 Drawing Sheets

U.S. PATENT DOCUMENTS

| | | | |
|---|---|---|---|
| 2004/0260653 A1* | 12/2004 | Tsuei et al. | 705/54 |
| 2005/0075958 A1* | 4/2005 | Gonzalez | 705/35 |
| 2005/0177510 A1 | 8/2005 | Hilt et al. | |
| 2006/0202025 A1 | 9/2006 | Calabrese et al. | |
| 2006/0218086 A1* | 9/2006 | Campbell et al. | 705/39 |
| 2007/0005613 A1 | 1/2007 | Singh et al. | |
| 2007/0005774 A1 | 1/2007 | Singh et al. | |
| 2007/0203836 A1 | 8/2007 | Dodin | |
| 2007/0276764 A1 | 11/2007 | Mann et al. | |
| 2008/0167991 A1 | 7/2008 | Carlson et al. | |

FOREIGN PATENT DOCUMENTS

| | | |
|---|---|---|
| WO | WO 96/13814 A1 | 5/1996 |
| WO | WO 2004/077369 A1 | 9/2004 |

OTHER PUBLICATIONS

Emmerson, Kassidy; "The History of PayPal: One of the Most Successful Online Money Transmitters Today"; 2009, http://www.associatedcontent.com/pop_print.shtml?content_type=arti . . . , 1 page.

International Preliminary Report on Patentability from International Application No. PCT/US2007/088289 dated Jun. 30, 2009.

* cited by examiner

Example Account 2
- Name: John Doe
- Mobile #: (123)555-8888
- CC1: 6xxxxxxxxxxx6666
- CC2: 7xxxxxxxxxxx7777
- Alias: beachbum

504

Example Account 1
- Name: Jane Doe
- Mobile #: (123)555-7777
- CC1: 4xxxxxxxxxxx4444
- CC2: 5xxxxxxxxxxx5555
- Alias: worldtraveler

MOBILE PAYMENT SYSTEM AND METHOD USING ALIAS

CROSS-REFERENCES TO RELATED APPLICATIONS

This patent application is a non-provisional of and claims priority to U.S. provisional patent application No. 60/871,898, filed on Dec. 26, 2006, which is herein incorporated by reference in its entirety for all purposes.

BACKGROUND

The use of mobile phones to conduct financial transactions is growing in popularity. Various means of using mobile phones to conduct financial transactions have been tried. The most common involves sending a payment to a payee using the payee's cellular phone number as an identifier. This approach gives rise certain difficulties, however. First, the payee must have a cellular phone which is capable of receiving the payments. Second, the payer must know the payee's phone number. As cellular phone numbers tend to change frequently, a payer must make certain that the phone number being used is current. Otherwise, the payer runs the risk of sending a payment to an unintended third party, who has been assigned the intended payee's old phone number. Further, in some cases, the payee and payee may not wish to reveal personal information such as their cellular phone numbers to each other. Accordingly, there is a need for a new method of conducting financial transactions using phones.

Embodiments of the invention address these and other problems.

BRIEF SUMMARY

Embodiments of the invention are directed to methods and systems for allowing payments to be made using mobile phones.

One embodiment of the invention is directed to a method. The method comprises receiving a payment request message from a mobile phone operated by a payer, wherein the payment request message includes a request to pay a payee a predetermined amount of money, and wherein the payment request message comprises a personal alias uniquely associated with the payee and a transaction amount. The payment request message is analyzed to determine if the payer is authorized to pay the payee. A payment notification message is sent to the payee indicating that a payment from the payer to the payee has been made.

Another embodiment of the invention is directed to a method. The method comprises receiving a payment request message from a payer, the payment request message comprising an amount of money to be paid to a payee and an alias associated with the payee, where the payment request message is sent by the payer via a mobile phone operated by the payer. An authentication request message is sent to the mobile phone in response to the message. An authentication token is received from the payer in response to sending the authentication request message. The authentication token is sent by the payer using the mobile phone, and the authentication token that is associated with the payer is verified. If the authentication token is verified as being associated with the payer, a payment for the amount of money to the payee using the alias is initiated.

Another embodiment of the invention is directed to a method. The method comprises receiving a registration request from a payee to create an alias uniquely associated with that payee, where the request specifies the alias requested. The payee operates a mobile phone and can receive or make payments using the alias and mobile phone. The alias is compared with other previously registered aliases associated with other payees. If the requested alias has not already been associated with another payee, the alias associated with the payee is registered.

Other embodiments of the invention are directed to systems, computer readable media, and devices adapted to implement the above methods.

These and other embodiments of the invention are described in further detail below.

BRIEF DESCRIPTION OF THE DRAWINGS

FIG. 5 shows information that can be provided when registering aliases.

DETAILED DESCRIPTION

Embodiments of the invention are directed to making person-to-person (P2P) and/or person-to-business (P2B) payments, using mobile phones. In embodiments of the invention, a payer may send a payment request message to a payment processing network. The payment request message identifies the desired payee using an alias, which is uniquely associated with the payee. The payment processing network may then determine who the payee is using an enrollment and alias database, and may forward the payment request message to a payer institution. The payer institution may be a payer bank and the payer may have a payer account associated with it. The payer institution may thereafter analyze the payment request message and may authorize or not authorize the transaction depending on whether the payer has sufficient credit and/or funds in the payer's account. If the payment request is approved by the payer institution, the payer institution may thereafter transfer funds from the payer's account at the payer institution to a payee account at a payee institution.

The payment request message may be sent from the payer's mobile phone in any suitable manner. In one example, a payer may send the payment request message to the payment processing network via a Web page accessed by the phone. In another example, the payer may send the payment request message to the payment processing network using an SMS message (i.e., a text message). In yet another example, the payer may send the payment request message to the payment processing network using a software application on the phone.

The payment transactions according to embodiments of the invention may take place in any suitable context. For example, suitable payment transactions may involve purchases of goods and services from merchants or individuals in a person to business or person to person context. However, in some embodiments of the invention, a payer may make payments and the payments can be made without any return consideration (e.g., a good or service purchased). For example, a payment may be a gift to the payee or repayment of a debt to the payee where the payer does not receive immediate consideration for the payment.

I. Systems

Figure 1:
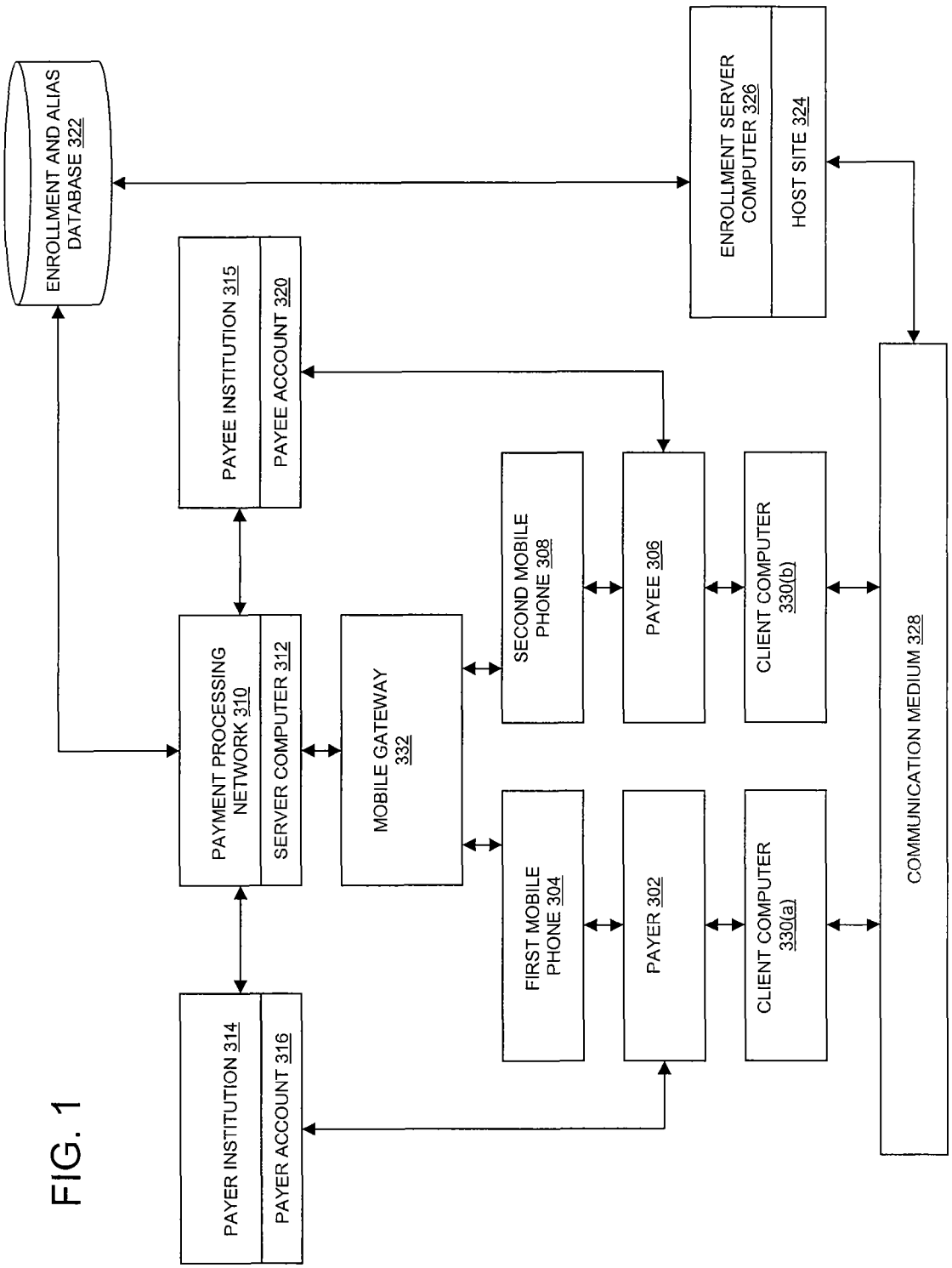
FIG. 1 shows a block diagram of a system according to an embodiment of invention.

FIG. 1 shows a system that can be used in an embodiment of the invention. Embodiments of the invention may use some or all of the components shown in FIG. 1.

The illustrated system includes a payer 302 and a first mobile phone 304 associated with the payer 302. The payer 302 has a payer account 316 at a payer institution 314. Similarly, the system includes a payee 306 and a second mobile phone 308 associated with the payee 306. The payee 306 has a payee account 320 at a payee institution 315.

In this example, the payer institution 314 and payee institution 315 are shown as separate entities. The payer 302 and payee 306 could use the same financial institution in other embodiments of the invention.

The payer institution 314 and payee institution 315 are typically banks that manage financial accounts for individuals or businesses. However, they could also be business entities such as retail stores.

The payer 302 and payee 306 may be individuals, or organizations such as businesses that are capable of entering into financial transactions (e.g., payment transactions).

The payment processing network 310 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of financial transactions. VisaNet™, in particular, includes a VIP system (Visa Integrated Payments system) which processes authorization requests and a Base II system which performs clearing and settlement services.

The payment processing network 310 may include a payment server computer 312. A "server computer" is typically a powerful computer or cluster of computers. For example, a server computer can be a large mainframe, a minicomputer cluster, or a group of servers functioning as a unit. In one example, a server computer may be a database server coupled to a Web server. The server computer 312 may form part of any suitable wired or wireless network, including the Internet.

A mobile gateway 332 may be operatively coupled to the payment processing network 310 and may allow the first and second mobile phones 304, 306 to communicate with the payment processing network 310. The mobile gateway 332 may be embodied by any suitable combination of hardware and/or software known to those of ordinary skill in the art.

The system may also comprise a payer client computer 330(a) as well as a payee client computer 330(b). They can be in communication with an enrollment server computer 326 operating a host site 324 (e.g., a Web site), via a communication medium 328. The communication medium 328 may comprise any suitable combination of wired and/or wireless networks including the Internet. The enrollment server computer 326 may store aliases in an enrollment and alias database 322. The payment processing network 310 can subsequently identify the payee 302 and payer 306 using the information stored in the enrollment and alias database 322. In other embodiments, there can be a separate enrollment database and a separate alias database.

Figure 2:
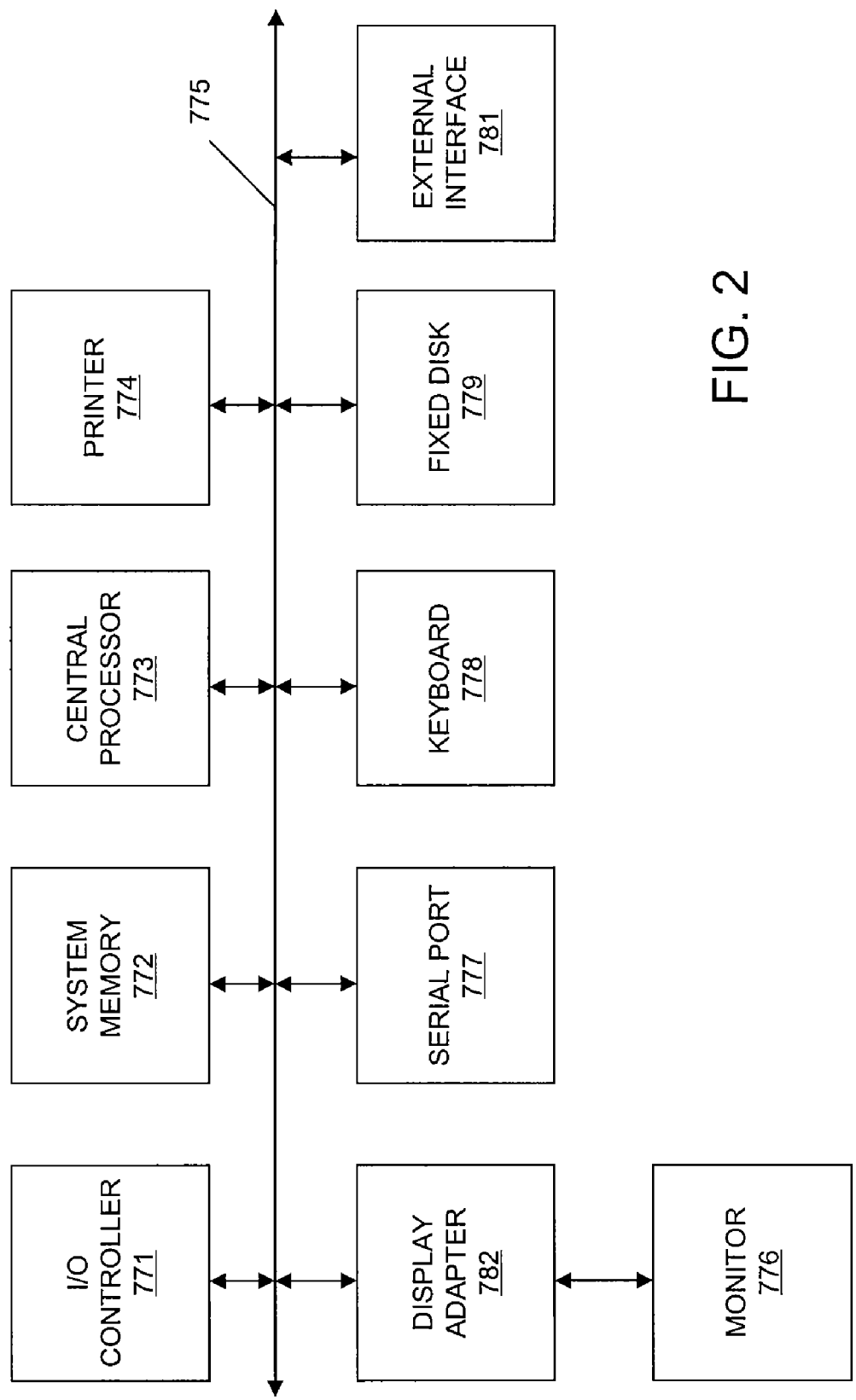
FIG. 2 shows a block diagram of components in a computer.

FIG. 2 shows typical components or subsystems of a computer apparatus. Such components or any subset of such components may be present in various components shown in FIG. 1, including the payment server computer 312, the enrollment server computer 326, the client computers 330(a), 330(b), etc. The subsystems shown in FIG. 2 are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus 775 allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Figure 3:
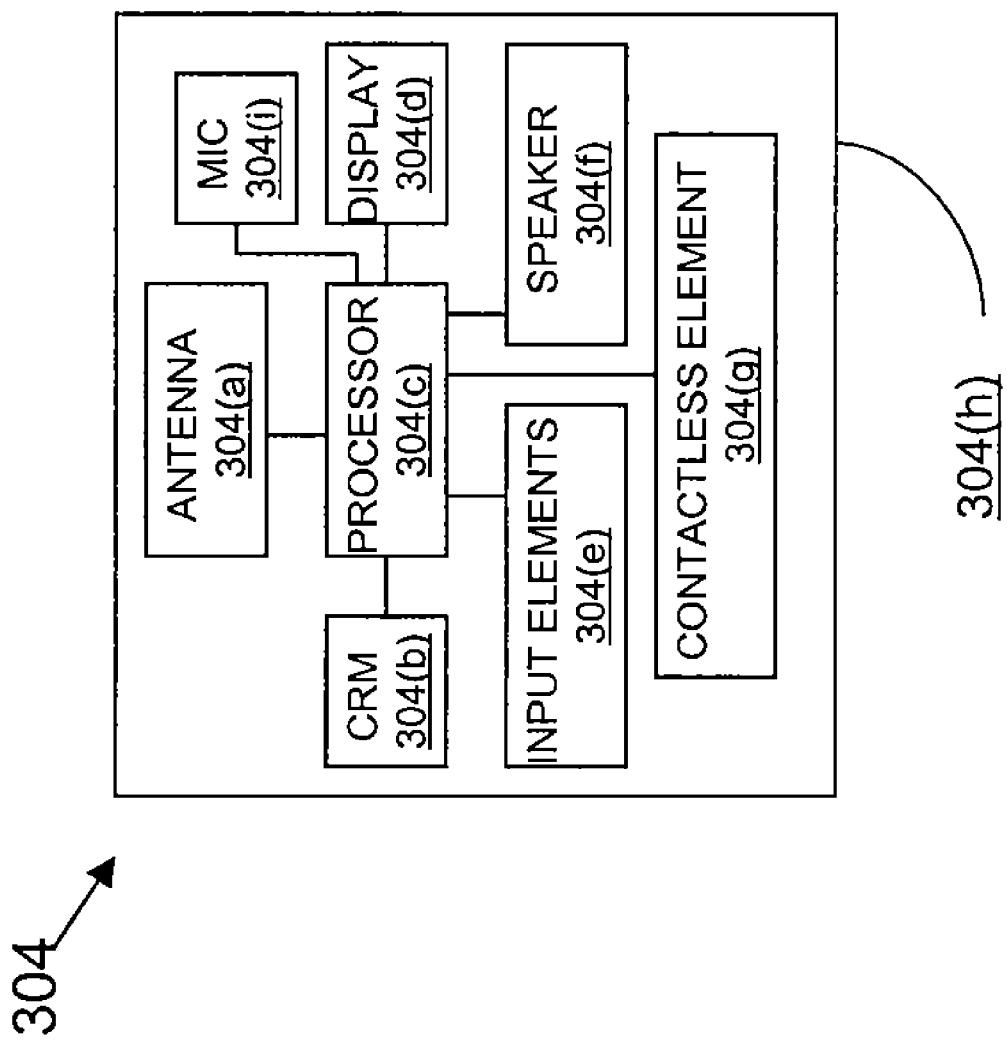
FIG. 3 shows a block diagram of components in a mobile phone.

FIG. 3 shows a block diagram of some components of the first mobile phone 304. Some or all of the components in the first mobile phone 304 may also be present in the second mobile phone 308 (illustrated in FIG. 1).

The phone 304 may comprise a computer readable medium 304(b) and a body 304(h) as shown in FIG. 3. The computer readable medium 304(b) may be present within body 304(h), or may be detachable from it. The body 304(h) may be in the form a plastic substrate, housing, or other structure. The computer readable medium 304(b) may be a memory that stores data and may be in any suitable form including a magnetic stripe, a memory chip, etc.

The computer readable medium 304(b) may comprise code for performing any of the functions described herein. For example, it may comprise code for sending a payment request message using a mobile phone to a payment processing network, where the payment request message comprises an amount of money to be paid and an alias, where the alias is associated with a payee; code for receiving in response to the payment request message an authentication request message, where the authentication request message is received via the mobile phone; and code for sending an authentication token in response to the authentication request message.

The phone 304 may further include a contactless element 304(g), which is typically implemented in the form of a semiconductor chip (or other data storage element) with an associated wireless transfer (e.g., data transmission) element, such as an antenna. Contactless element 304(g) is associated with (e.g., embedded within) portable consumer device 304 and data or control instructions transmitted via a cellular network may be applied to contactless element 304(g) by means of a contactless element interface (not shown). The contactless element interface functions to permit the exchange of data and/or control instructions between the mobile device circuitry (and hence the cellular network) and an optional contactless element 304(g).

Contactless element 304(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 304 and a payment processing network 26 or it can be used to exchange data between the phone 304 and an access device (e.g., a POS terminal). Thus, the phone 304 is capable of communicating and transferring data and/or control instructions via both cellular network and near field communications capability.

The phone 304 may also include a processor 304(c) (e.g., a microprocessor) for processing the functions of the phone 304 and a display 304(d) to allow a payee to see phone numbers and other information and messages. The phone 304 may further include input elements 304(e) to allow a payee to input information into the device, a speaker 304(f) to allow the payee to hear voice communication, music, etc., and a microphone 304(i) to allow the payee to transmit her voice through the phone 304. The phone 304 may also include an antenna 304(a) for wireless data transfer (e.g., data transmission).

II. Enrollment Methods

In embodiments of the invention, payers and payees may first enroll in the system. The payee and the payer may enroll in any suitable manner. For example, referring to FIG. 1, the payee and the payer may enroll in the system via the host site 324 using the client computers 330(a), 330(b). Enrollment information such as name, account number, etc. may be stored by the server computer 326 in the enrollment and alias database 322. This information can be used in subsequent payment processes to identify the payer 302 or the payee 306.

In some cases, a financial institution such as the payee institution 315 or the payer institution 314 may "push" pre-enrollment data to the enrollment and alias database 322. The payer institution 314, for example, may validate the payer 302 ahead of time. The payer institution 314 may do this ahead of time, because it knows the payer 302 and the payer's credit history and account balance information. After the payer 302 is enrolled in the system, the payer 302 may set up an appropriate alias to use the system. The same may be true for the payee 306. Thus, in some embodiments, the payer 302 need not do anything to enroll and need only set up her payment alias.

In embodiments of the invention, a number of aliases may be used. Aliases may include payment processing organization aliases for the payment processing organization that operates the payment processing network, a payee alias associated with the payee and the payee's phone, and a payer alias associated with the payer and the payer's phone. Examples of payer and payee aliases include "worldtraveler" and "beachbum." An example of a service alias may be "myvisa" for a payment processing organization such as Visa.

Other aliases that can be registered include portable consumer device aliases (payment card aliases). For example, the payer 302 may have first and second credit cards and they may have the aliases CC1 and CC2. Such portable consumer device aliases may or may not be uniquely associated with their holders.

Figure 4:
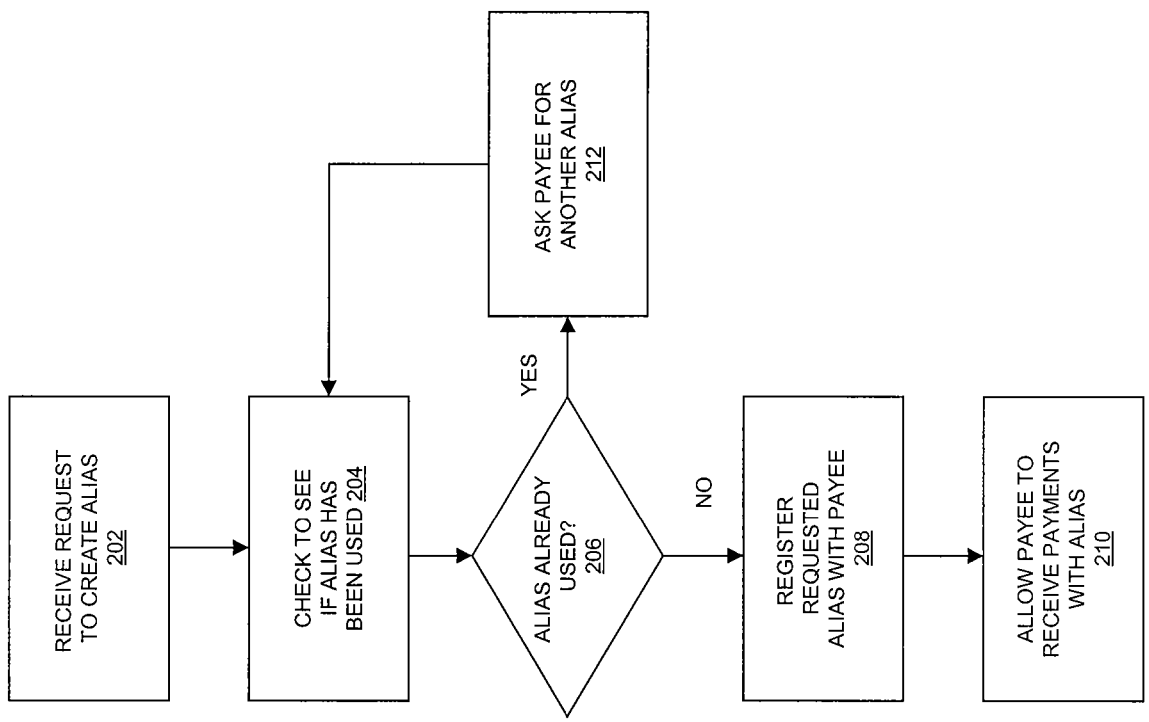
FIG. 4 shows a flowchart illustrating an alias registration process.

Referring to FIGS. 1 and 4, in the first step 202, a payee 306 requests assignment of an alias. In preferred embodiments, the payee 306 may specify a particular alias. However, in other embodiments, a payment processing organization may assign an alias to the payee 306. To register an alias, the payee 306 may use the client computer 330(b) to contact the host site 324 on the server computer 326. The host site 324 may comprise a wizard or other mechanism to allow the payer 302 and the payee 306 to enter information.

In the next step 204, the server computer 326 checks the enrollment and alias database 322 to see if the requested alias is already being used by another payee or payer. If the requested alias already exists, then the payee 306 may be asked to provide another alias (step 212). Alternatively or additionally, the alias registration request may reject the proposed alias if it is offensive or is a third party trademark or servicemark.

If the alias has not been previously registered, then the server computer 326 may register the requested alias for the payee 208. This information may be stored in the enrollment and alias database 322. Once the alias has been registered for the payee 306, the payment processing organization may begin allowing the payee to receive payments made using the alias (step 210).

This method and other related embodiments of the invention allow for efficient cross-institution payments to be made, by uniquely identifying an individual, business, etc., via an alias. The aliases may be associated with many accounts or services operated by an individual or entity, if desired. In some embodiments, these various aliases can be registered for a fee, and consumers may be charged a registration and renewal fee for using certain aliases. Other embodiments may provide the enrollment and alias database as a free service, or charge only certain classes of entities (e.g. charge only payees, or for-profit corporations).

III. Payment Methods

Figure 6:
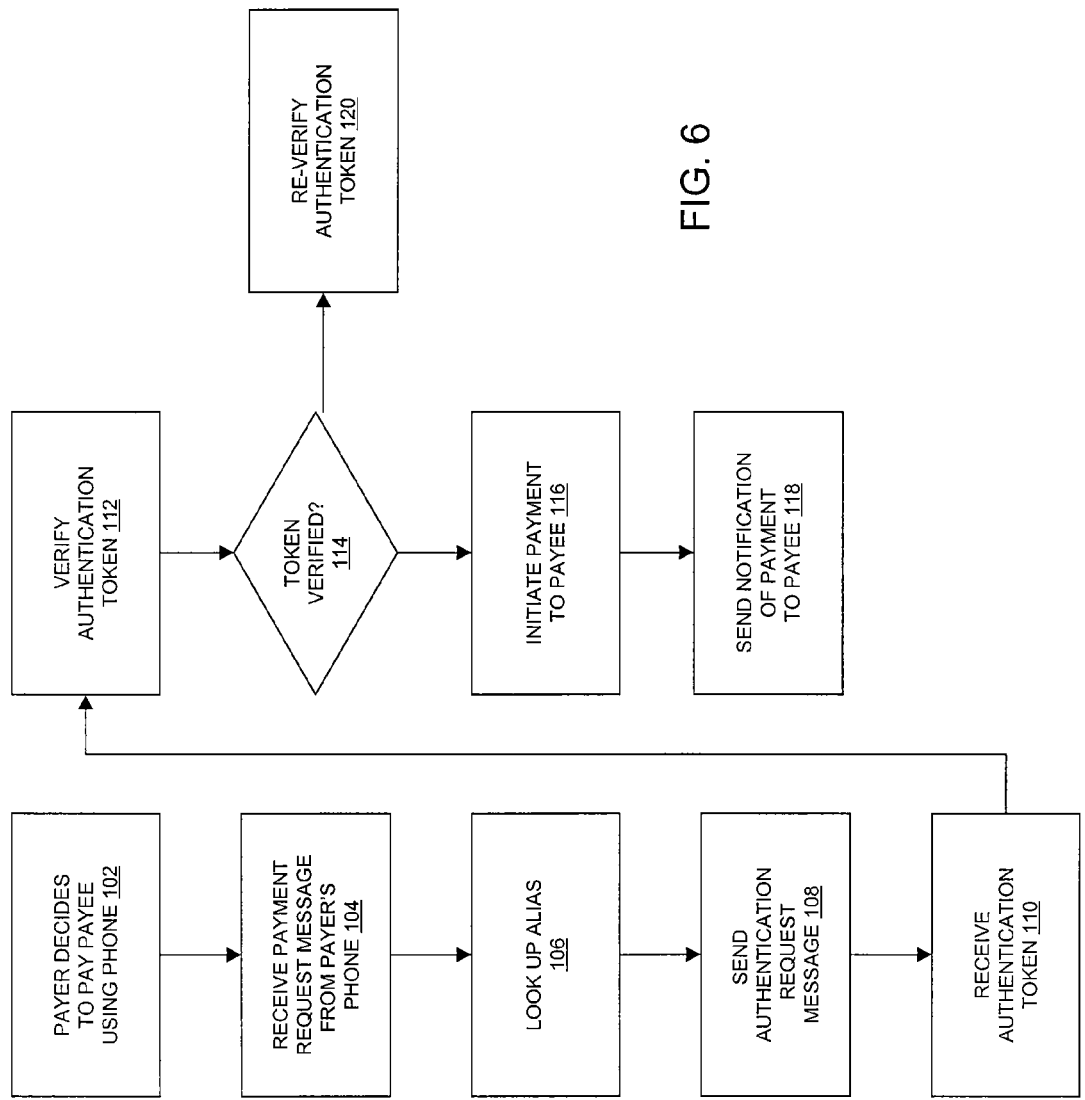
FIG. 6 shows a flowchart illustrating a payment method according to an embodiment of the invention.

FIG. 6 shows a flowchart illustrating a payment method according to an embodiment of the invention. In the first step 102 the payer 302 decides to pay the payee 306 using the first mobile phone 304.

A payer 302 then uses the first mobile phone 304 and sends a payment request message to the payment processing network 310 and the payment processing network 310 receives the payment request message (step 104). The payment request message comprises at least a payment amount and a payee alias. The payment request message may also comprise other information, such as an alias or number identifying a specific financial account from which payment is to be made, or a time in the future at which payment is to be initiated.

As noted above, the payment request message may take a variety of different forms. For example, the payment request message could be in the form of an SMS message. The request could also come in the form of an email, or a voice interaction with an IVR unit. The request could also be made via a software application on the phone, which sends one or more network packets containing the request data.

In the next step 106, using the enrollment and alias database 322, the server computer 312 in the payment processing network 310 analyzes the payment request message and uses the payee alias in the payment request message to identify the payee 306, and also the payer institution 314 and the payer account 316.

To provide security to the system, an optional authentication request message is sent from the payment processing network to the first mobile phone 304 operated by the payer 108. The authentication request message may be initiated by the payer institution 314 or by a payment processing organization affiliated with the payment processing network 310. It may request entry of a password, or personal information such as an address or social security number to verify the identity of the payer 108. The authentication request message may take a variety of forms, as described for the payment request message 104 above. In preferred embodiments, the authentication request message will be sent to the payer's mobile phone 304. It could also be sent to the payer's client computer 330(a).

In the next step 110, the payer 302 provides an authentication token to the payment processing network 310. For example, the payer 302 may enter a PIN (personal identification number) into the first mobile phone 304 and may then send the authentication token back to the payment processing network 310, and the payment processing network 310 may or may not forward it to the payer institution 314. Other examples of authentication tokens include passwords, birthdates, and other personal information associated with the payer 302.

The payment processing network 310 (or the payer institution 314) then verifies the authentication token 112. If the authentication token is invalid, the payment request in the payment request message may be rejected. Alternatively, the payment processing network 310 may re-verify the authentication token (step 120) by sending another authentication request message to the payer 302 via the first mobile phone 304.

If the payer 302 and/or the first mobile phone 304 are authenticated, the payment processing network 310 may send the payment request message to the payer institution 314 for approval. The payment request message may be re-formed to remove various aliases and may include real information, if desired. The payer institution 314 may then approve of the payment request if there are sufficient funds and/or credit in the payer account 316 or disapprove it if there are insufficient funds or credit. If the payment request is approved, at some point in time (e.g., immediately or at the end of the day if clearing and settling need to take place), actual funds may be transferred from the payer account 316 to the payee account 320 via the payment processing network 310.

Once the funds have been transferred from the payer account 316 to the payee account 320, a payment notification message may sent to the mobile phone 308 and/or the client computer 330(b) operated by the payee 118 after the payment request in the payment request message has been approved by the payer institution 314.

In a specific example, a payer 302 such as Jane and a payee 306 such as John register on the host site 324 run on a remote server computer 326 using their client computers 330(a), 330(b).

As shown in FIG. 5, Jane registers personal information 502 including her name, mobile telephone number, first credit card account number, second credit card account number, and a personal alias. John may similarly register his personal information 504. In this example, Jane creates the personal alias "worldtraveler," while John creates the personal alias "beachbum."

After registering, a payment processing organization may provide both John and Jane with a phone number for the service that will facilitate further payment processing. In other embodiments, the payment processing organization may provide John and Jane with a service alias instead of or in addition to the service phone number. For example, instead of providing John and Jane with the service phone number 555-555-5555, the payment processing organization may provide the service alias "myvisa" to John and Jane. The service alias may be referred to as a "short-code" in some cases, and may include a string of characters of variable length.

In an exemplary transaction, Jane may be a payer 302 and wants to pay $15.00 to a payee 306 named John. Payee Jane 302 initiates a payment to John by entering the payment request message "myvisa pay beachbum $15.00" into her phone 304, and sending the message via SMS to the server computer 312 in the payment processing network 310 via the mobile gateway 332. The alias "beachbum" is used instead of John's phone number. The service alias "myvisa" is used instead of the phone number of the service.

Jane may also use a portable consumer device alias such as "CC2" to indicate the particular credit card that Jane wants to use to pay John. For example, payee Jane 302 may enter the payment request message "myvisa pay beachbum $15.00 CC2" into her phone 304 to indicate that her second credit card is to be used to make the intended payment. Jane may alternatively or additionally designate a default credit card account number.

After entering the payment request message "myvisa pay beachbum $15.00 CC2" into her mobile phone 304, the payment request message is sent from her phone 304 to the payment processing network 310 (e.g., as described above), and then (in this example) to an issuer of the credit card (or other portable consumer device). In this example, the issuer of the credit card may be the payer institution 314.

The payment processing network 310 may receive the payment request message and may then optionally respond by sending an an authentication request message to the payer 302. In this example, an authentication request message is sent in the form of a call from an interactive voice response unit (IVR) at a telecom server or the like, which asks payer Jane 302 to enter her mobile PIN (personal identification number) 510. After payer Jane 302 enters the correct PIN into her phone 304, the payer institution 314 and/or the server computer 312 in the payment processing network 310 can then analyze the payment request message and can approve or decline the payment request. If the payment request is approved, appropriate funds may be transferred to the payee account 320 at the payee institution 315. For example, payee John's portable consumer device account (e.g., credit card account) at John's bank (e.g., the payee institution 315) can be credited with the payment amount. Payer Jane's account 316 can be subsequently debited for the payment amount.

In some embodiments, a payment notification message in the form of an SMS, e-mail, or some other type of message may be sent to the payee's mobile phone 308, informing the payee John 306 that a payment from the payee John 302 has been made. In preferred embodiments, the payment notification message may be sent to payee John's mobile phone 308, but it could be sent to the client computer 330(b) operated by the payee John 306.

Embodiments of the invention have a number of advantages. First, the use of an alias allows for a transaction to be completed while keeping the personal information of the transacting parties confidential. This is useful because, for example, a payer may not want to disclose his or her phone number to a payee, or vice versa. Second, the alias allows for payments to be made even if a payee's telephone number or financial account changes. A payer may thus store a list of aliases for payees with whom the payer frequently does business, and may initiate repeated payments without having to verify that the payee's telephone number is the same. Third, aliases tend to be much easier to remember than either phone numbers or financial account numbers. Consequently, embodiments of the invention will be easier to use than other methods. Fourth, embodiments of the invention allow for many accounts to be accessed from a single mobile phone, eliminating the need to carry a large number of portable consumer devices.

Any of the above-described methods or steps of such methods may be embodied as software code to be executed by a processor of the server computer or any other suitable combination of devices using any suitable computer language such as, for example, Java, C++ or Perl using, for example, conventional or object-oriented techniques. The software code may be stored as a series of instructions or commands on a computer readable medium, such as, a random access memory (RAM), a read only memory (ROM), a magnetic medium such as a hard-drive or a floppy disk, or an optical medium such as a CD-ROM.

It should be understood that the present invention can be implemented in the form of control logic, in a modular or integrated manner, using software, hardware or a combination of both. Based on the disclosure and teachings provided herein, a person of ordinary skill in the art will appreciate other ways and/or methods to implement the present invention.

Any of the above-described embodiments and/or any features thereof may be combined with any other embodiment(s) and/or feature(s) without departing from the scope of the invention.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

What is claimed is:

1. A method for conducting a transaction comprising:
   receiving a payment request message, at a server computer, from a mobile phone operated by a payer, wherein the payment request message includes a request to pay a payee a predetermined amount of money, and wherein the payment request message comprises a combination of a personal alias associated with the payee, a payment card alias, and a transaction amount, and wherein the personal alias allows the personal information of the payee to remain confidential;
   analyzing the payment request message, using the server computer, to determine if the payer is authorized to pay the payee; and
   sending a payment notification message, using the server computer, to the payee indicating that a payment from the payer to the payee has been made.

2. The method of claim 1, further comprising:
   sending an authentication request message to the payer, wherein the authentication request message includes a message asking the payer to enter a PIN; and
   receiving the PIN.

3. A computer readable medium comprising code for:
   receiving a payment request message from a mobile phone operated by a payer, wherein the payment request message includes a request to pay a payee a predetermined amount of money, and wherein the payment request message comprises a combination of a personal alias associated with the payee, a payment card alias, and a transaction amount, and wherein the personal alias allows the personal information of the payee to remain confidential;
   analyzing the payment request message to determine if the payer is authorized to pay the payee; and
   sending a payment notification message to the payee indicating that a payment from the payer to the payee has been made.

4. A server computer comprising a computer readable medium comprising:
   code for receiving a payment request message from a mobile phone operated by a payer, wherein the payment request message includes a request to pay a payee a predetermined amount of money, and wherein the payment request message comprises a combination of a personal alias associated with the payee, a payment card alias, and a transaction amount, and wherein the personal alias allows the personal information of the payee to remain confidential;
   code for analyzing the payment request message to determine if the payer is authorized to pay the payee; and
   code for sending a payment notification message to the payee indicating that a payment from the payer to the payee has been made.

5. A system comprising:
   a server computer comprising a computer readable medium comprising: code for receiving a payment request message from a mobile phone operated by a payer, wherein the payment request message includes a request to pay a payee a predetermined amount of money, and wherein the payment request message comprises a combination of a personal alias associated with the payee, a payment card alias, and a transaction amount, and wherein the personal alias allows the personal information of the payee to remain confidential; code for analyzing the payment request message to determine if the payer is authorized to pay the payee; and code for sending a payment notification message to the payee indicating that a payment from the payer to the payee has been made; and
   a mobile phone.

6. A method for conducting a transaction comprising:
   receiving a payment request message, at a server computer, from a payer, the payment request message comprising a combination of an amount of money to be paid to a payee, an alias associated with the payee, and a payment card alias, and wherein the alias associated with the payee allows the personal information of the payee to remain confidential, where the payment request message is sent by the payer via a mobile phone operated by the payer;
   sending an authentication request message, using the server computer, to the mobile phone in response to the payment request message, where the authentication request message is sent to the mobile phone;
   receiving an authentication token, at the server computer, from the payer in response to sending the authentication request message, where the authentication token is sent by the payer using the mobile phone;
   verifying that the authentication token is associated with the payer, using the server computer; and
   if the authentication token is verified as being associated with the payer, then initiating a payment, using the server computer, for the amount of money to the payee using the alias.

7. The method according to claim 6, wherein the mobile phone is a first mobile phone, and wherein the method further comprises:
   sending an electronic notification of the payment to a second phone mobile operated by the payee.

8. The method according to claim 6, where the payment request message is in the form of a text message.

9. The method according to claim 6, where the payment request message is in the form of an email.

10. The method according to claim 6, where the authentication request message comprises a telephone call made by an electronic interactive voice response unit.

11. The method of claim 6, where the authentication token comprises a password.

12. The method of claim 6, where the authentication token comprises a piece of personal information associated with the payee.

13. A method for registering an alias comprising:
    receiving a registration request, at a server computer, from a payee to create an alias uniquely associated with that payee, where the request specifies the alias requested, and wherein the payee operates a mobile phone and can receive or make payments using the alias and mobile phone, and wherein the alias allows the personal information of the payee to remain confidential;

comparing the alias, using the server computer, with other previously registered aliases associated with other payees; and if the requested alias has not already been associated with another payee, registering the alias with the payee, using the server computer,.

14. A server computer comprising a computer readable medium comprising:

code for receiving a registration request from a payee to create an alias uniquely associated with that payee, where the request specifies the alias requested, and wherein the payee operates a mobile phone and can receive or make payments using the alias and mobile phone and wherein the alias allows the personal information of the payee to remain confidential;

code for comparing the alias with other previously registered aliases associated with other payees; and code for if the requested alias has not already been associated with another payee, registering the alias with the payee.

15. A method for conducting a transaction comprising:

sending a payment request message using a mobile phone to a payment processing network, where the payment request message comprises a combination of a payment card alias, an amount of money to be paid and an alias, where the alias is associated with a payee, and wherein the alias associated with the payee allows the personal information of the payee to remain confidential;

receiving in response to the payment request message an authentication request message, where the authentication request message is received via the mobile phone; and sending an authentication token in response to the authentication request message, using the mobile phone.

16. The method according to claim 15, where the payment request message is in the form of a text message.

17. The method according to claim 15, where the payment request message is in the form of an email.

18. The method according to claim 15, where the authentication request message comprises a telephone call made by an electronic interactive voice response unit.

19. The method of claim 15, where the authentication token comprises a password.

20. The method of claim 15, where the authentication token comprises a piece of personal information associated with the consumer.

21. A computer readable medium comprising code for:

sending a payment request message using a mobile phone to a payment processing network, where the payment request message comprises a combination of a payment card alias, an amount of money to be paid and an alias, where the alias is associated with a payee, and wherein the alias associated with the payee allows the personal information of the payee to remain confidential;

receiving in response to the payment request message an authentication request message, where the authentication request message is received via the mobile phone; and sending an authentication token in response to the authentication request message.

22. A phone comprising a computer readable medium comprising:

sending a payment request message using a mobile phone to a payment processing network, where the payment request message comprises a combination of a payment card alias, an amount of money to be paid and an alias, where the alias is associated with a payee, and wherein the alias associated with the payee allows the personal information of the payee to remain confidential;

receiving in response to the payment request message an authentication request message, where the authentication request message is received via the mobile phone; and sending an authentication token in response to the authentication request message.

23. The method of claim 1 wherein the payment request message further comprises a payment processing organization alias.

24. The method of claim 6 wherein the payment request message further comprises a payment processing organization alias.

25. The method of claim 15 wherein the payment request message further comprises a payment processing organization alias.

26. The phone of claim 22 wherein the payment request message further comprises a payment processing organization alias.

27. The method of claim 1 wherein the payment request message further comprises a payer alias.

28. The method of claim 6 wherein the payment request message further comprises a payer alias.

29. The method of claim 15 wherein the payment request message further comprises a payer alias.

30. The phone of claim 22 wherein the payment request message further comprises a payer alias.

* * * * *